US011477704B2

United States Patent
Yousif et al.

(10) Patent No.: US 11,477,704 B2
(45) Date of Patent: Oct. 18, 2022

(54) MULTI-GBPS WIRELESS DATA COMMUNICATION SYSTEM FOR VEHICULAR SYSTEMS

(71) Applicant: The Boeing Company, Chicago, IL (US)

(72) Inventors: Aziz Yousif, Mukilteo, WA (US); Anil Kumar, Sammamish, WA (US); David A. Bush, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/154,269

(22) Filed: Jan. 21, 2021

(65) Prior Publication Data

US 2021/0176673 A1  Jun. 10, 2021

Related U.S. Application Data

(62) Division of application No. 16/022,637, filed on Jun. 28, 2018, now Pat. No. 10,932,167.

(51) Int. Cl.
*H04W 36/00* (2009.01)
*H04W 4/40* (2018.01)
(Continued)

(52) U.S. Cl.
CPC ......... *H04W 36/0038* (2013.01); *H04W 4/02* (2013.01); *H04W 4/40* (2018.02);
(Continued)

(58) Field of Classification Search
CPC ..... H04W 64/00; H04W 36/30; H04W 24/08; H04W 36/00837; H04W 72/085;
(Continued)

(56) References Cited

U.S. PATENT DOCUMENTS 7,483,696 B1 * 1/2009 Mitchell ............ H04B 7/18508
455/431
10,200,882 B1 2/2019 Nelapati et al.
(Continued)

FOREIGN PATENT DOCUMENTS

| EP | 3 249 942 A1 | 11/2017 |
| WO | 2017/007383 A1 | 1/2017 |
| WO | 2017/147818 A1 | 9/2017 |

OTHER PUBLICATIONS

Extended European Search Report dated Aug. 21, 2019 in corresponding European Application No. 19182677.5.
(Continued)

*Primary Examiner* — Yee F Lam
(74) *Attorney, Agent, or Firm* — MH2 Technology Law Group LLP

(57) ABSTRACT

Provided is a method for determining access permission for a beamforming computing device communicating with a beamforming transceiver. The method includes obtaining, at an inter-zone sensor, location information from the beamforming computing device, wherein the inter-zone sensor is configured to monitor a location of the beamforming computing device; determining, by the inter-zone sensor, the location for the beamforming computing device based on the location information as the beamforming computing device nears a boundary between a first access zone and a second access zone; providing, by the inter-zone sensor, the location to a central control system; obtaining, by the inter-zone sensor, a command by the central control system that instructs the inter-zone sensor to communicate access instructions to a beamforming transceiver in the second access zone; and providing the access instructions to the beamforming transceiver.

20 Claims, 5 Drawing Sheets

(51) Int. Cl.
*H04W 4/02* (2018.01)
*H04W 12/08* (2021.01)
*H04W 36/32* (2009.01)
*H04W 48/16* (2009.01)
*H04B 7/06* (2006.01)

(52) U.S. Cl.
CPC ........... *H04W 12/08* (2013.01); *H04W 36/32* (2013.01); *H04W 48/16* (2013.01); *H04B 7/0617* (2013.01)

(58) Field of Classification Search
CPC ............... H04W 16/28; H04W 64/003; H04W 36/0094; H04W 88/08; H04W 72/048; H04W 36/0055; H04W 36/14; H04W 36/0058; H04W 48/16; H04W 48/12; H04W 36/0079; H04W 88/02; H04W 40/12; H04B 7/0695; H04B 7/088
See application file for complete search history.

(56) References Cited

U.S. PATENT DOCUMENTS

| | | | |
|---|---|---|---|
| 2006/0229070 A1* | 10/2006 | de La Chapelle | H01Q 25/00 455/431 |
| 2009/0055180 A1 | 2/2009 | Coon et al. | |
| 2012/0202430 A1* | 8/2012 | Jalali | H01Q 1/28 342/368 |
| 2014/0073337 A1* | 3/2014 | Hong | H04W 16/28 455/452.1 |
| 2014/0266896 A1* | 9/2014 | Hyslop | H04B 7/18506 342/368 |
| 2015/0004918 A1* | 1/2015 | Wang | H04W 36/0058 455/73 |
| 2015/0045048 A1* | 2/2015 | Xu | H04W 76/10 455/552.1 |
| 2015/0141040 A1 | 5/2015 | Kludt et al. | |
| 2015/0230263 A1* | 8/2015 | Roy | H04B 7/0695 455/452.2 |
| 2018/0006689 A1 | 1/2018 | Da Silva et al. | |
| 2018/0103404 A1* | 4/2018 | Emmanuel | H04L 43/16 |
| 2018/0152852 A1 | 5/2018 | Chang | |
| 2019/0075423 A1 | 3/2019 | Hrabak et al. | |
| 2019/0230569 A1 | 7/2019 | Kim et al. | |
| 2020/0408923 A1* | 12/2020 | Hayes | G01S 19/42 |

OTHER PUBLICATIONS

Communication pursuant to Article 94(3) EPC dated Aug. 25, 2021 in corresponding European Application No. 19182677.5, 6 pages.

* cited by examiner

MULTI-GBPS WIRELESS DATA COMMUNICATION SYSTEM FOR VEHICULAR SYSTEMS

CROSS-REFERENCE TO RELATED APPLICATIONS

This application is a divisional application to U.S. patent application Ser. No. 16/022,637 filed on Jun. 28, 2018, now U.S. Pat. No. 10,932,167 issued on Feb. 23, 2021, the disclosure of which is hereby incorporated by reference in its entirety.

FIELD

This disclosure describes a form of secure wireless communication for vehicular systems capable of multi-gigabit per second (GBPS) information rates.

BACKGROUND

A high-information rate and reliable communication infrastructure for transportation vehicles is essential to support consumer expectations. In the airline transportation environment, for example, most existing solutions are wire-based, thereby increasing weight, cost, production complexity, and maintenance burden for in-production, in-service, and retrofit aircraft models. Solutions to problems, such as video surveillance, security, and aircraft health monitoring, are typically segregated and highly decentralized. Existing solutions typically are not fully integrated to solve the myriad connectivity challenges within the aircraft cabin, making it difficult to concurrently monitor, consolidate, and transport data from different sources in a secure manner.

With the evolution of wireless networks, embedded systems, the Internet, and other technologies, there is an ever increasing demand for improving system performance metrics. These metrics include coverage, network bandwidth, security, and others. The performance metrics impact the operation of electronic devices employed in various settings, from computing and managing data to online shopping and social networking. These metrics are even more crucial now due to the digitization occurring in shared, networked environments, as opposed to traditional, stand-alone personal computers and mobile devices. As a result, data traffic, and especially wireless data traffic (e.g., 2.4 GHz, 3.6 GHz, 5 GHz, 60 GHz, etc.), has experienced exponential growth.

What is needed is a secure wireless transmission system capable of supporting high information rates for vehicular systems.

SUMMARY

In accordance with examples of the present disclosure, a secure high frequency wireless communication system is provided that can comprise a plurality of transceivers, an inter-zone sensor (IZS) system, beam-forming devices, a central database and data processing (CDDP) system, and a Multi-System Gateway (MSG). The CDDP is configured to receive a security rule definition for each of the plurality of transceivers; the security rules includes an acceptable angle of arrival (AoA) range and/or signal strength for each transceiver/beamforming device pair per zone, permitting the formation of narrow wireless communication beams between the transceivers and beamforming devices, if appropriate. AoA is a method by which the direction of propagation of a radio-frequency (RF) wave incident on an antenna array can be found. Furthermore, AoA can also be found by sweeping different antenna directions and searching for the maximum signal strength. The IZS is configured to determine parameters, such as the angle of arrival (AoA) and/or signal strength to beamforming devices in adjacent zones, especially those close to the zone boundary. For beamforming devices sufficiently close to a zone boundary, if the AoA of the IZS exceeds a predetermined range, the transmission permitted only if allowed by the security rules of the CDDP. Otherwise, the transmission is not permitted. Furthermore, the MSG, if enabled, permits communication of information to external systems.

Example millimeterWave (mmWave) communication systems may use analog and/or digital beamforming, for example, to compensate for high path-losses due to poor radio frequency (RF) propagation. In some cases, wireless devices may use beam sweeping procedures to allow the receiver to identify the best transmit beam. The mmWave band includes frequencies in the electromagnetic spectrum from 30 to 300 GHz. The receiver may then align its receive beam with the identified best transmit beam. These procedures may be simplified under an assumption of channel reciprocity (e.g., also referred to herein as beam correspondence). For example, in time division duplexing (TDD), the channel reciprocity assumption may assume that the uplink and downlink channels are identical. Since uplink and downlink are assumed identical, the wireless device (e.g., transceiver) may optimize its transmit beams based on an optimal (e.g., best) receive beam. Similarly, the wireless device may optimize its receive beam based on an optimal transmit beam.

In accordance with examples of the present disclosure, a method for determining access permissions for a beamforming computing device communicating with a beamforming transceiver is disclosed. The method comprises obtaining, at a central control system, location information from an inter-zone sensor, wherein the inter-zone sensor is configured to monitor and determine a location for the beamforming computing device as the beamforming computing device nears a boundary between a first access zone and a second access zone; accessing, by a storage device of the central control system, a rule to determine whether the beamforming computing device is permitted to operate in the second access zone; determining whether the beamforming computing device is permitted to operate in the second access zone based on the rule; and executing, by a rules engine of the central control system, a first command to the inter-zone sensor to instruct a beamforming transceiver in the second zone to initiate communication with the beamforming computing device. In some examples, a computer system including a hardware processor and a non-transitory computer readable medium is disclosed that can be configured to perform the method. In some examples, the location information is derived from a signal strength measurement, an angle of arrival, or both. In some examples, the method can further comprise registering the beamforming computing device with the rule. In some examples, the method can further comprise providing a second command the beamforming transceiver in the second zone to instruct communication with the beamforming computing device. In some examples, the beamforming computing device and the beamforming transceiver communicate over the mmWave frequency band, such as at 60 GHz.

In accordance with examples of the present disclosure, a method for determining access permission for a beamforming computing device with a transceiver communicating with a beamforming transceiver is disclosed. The method comprises obtaining, at an inter-zone sensor, location information from the beamforming computing device, wherein the inter-zone sensor is configured to monitor a location of the beamforming computing device; determining, by the inter-zone sensor, a location for the beamforming computing device based on the location information as the beamforming computing device nears a boundary between a first access zone and a second access zone; providing, by the inter-zone sensor, the location to a central control system; obtaining, by the inter-zone sensor, a command by the central control system that instructs the inter-zone sensor to communicate access instructions to a beamforming transceiver in the second access zone; and providing the instructions to the beamforming transceiver. In some examples, a computer system including a hardware processor and a non-transitory computer readable medium is disclosed that can be configured to perform the method. In some examples, the location information is derived from a signal strength measurement, an angle of arrival, or both. In some examples, the instruction is to permit the beamforming computing device to communicate with the beamforming transceiver. In some examples, the instruction is not to permit the beamforming computing device to communicate with the beamforming transceiver. In some examples, the beamforming computing device and the beamforming transceiver communicate over the mmWave frequency band, such as at 60 GHz.

In accordance with examples of the present disclosure, a transportation vehicle is provided. The transportation vehicle comprises an inter-zone sensor configured to define the transportation vehicle into a first access zone and a second access zone; a computer system comprising: a hardware processor; a non-transitory computer readable medium configured to store operations that when executed by the hardware processor perform a method for determining access permission for a beamforming computing device communicating with a beamforming transceiver, the method comprising: obtaining location information from the beamforming computing device, wherein the inter-zone sensor is configured to monitor a location of the beamforming computing device; determining the location for the beamforming computing device based on the location information as the beamforming computing device nears a boundary between the first access zone and the second access zone; providing the location to a central control system; obtaining a command by the central control system that instructs the inter-zone sensor to communicate access instructions to a beamforming transceiver in the second access zone; and providing the access instructions to the beamforming transceiver.

In some examples, the location information is derived from a signal strength measurement, an angle of arrival, or both. In some examples, the access instructions permit the beamforming computing device to communicate with the beamforming transceiver. In some examples, the access instructions do not permit the beamforming computing device to communicate with the beamforming transceiver. In some examples, the beamforming computing device and the beamforming transceiver communicate over a millimeter wave band.

In accordance with examples of the present disclosure, a computer system is provided. The computer system comprises an inter-zone sensor; a hardware processor; a non-transitory computer readable medium configured to store operations that when executed by the hardware processor perform a method for determining access permission for a beamforming computing device communicating with a beamforming transceiver, the method comprising: obtaining location information from the beamforming computing device, wherein the inter-zone sensor is configured to monitor a location of the beamforming computing device; determining the location for the beamforming computing device based on the location information as the beamforming computing device nears a boundary between a first access zone and a second access zone; providing the location to a central control system; obtaining a command by the central control system that instructs the inter-zone sensor to communicate access instructions to a beamforming transceiver in the second access zone; and providing the access instructions to the beamforming transceiver. In some examples, the location information is derived from a signal strength measurement, an angle of arrival, or both. In some examples, the access instructions permit the beamforming computing device to communicate with the beamforming transceiver. In some examples, the access instructions do not permit the beamforming computing device to communicate with the beamforming transceiver. In some examples, the beamforming computing device and the beamforming transceiver communicate over a millimeter wave band.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
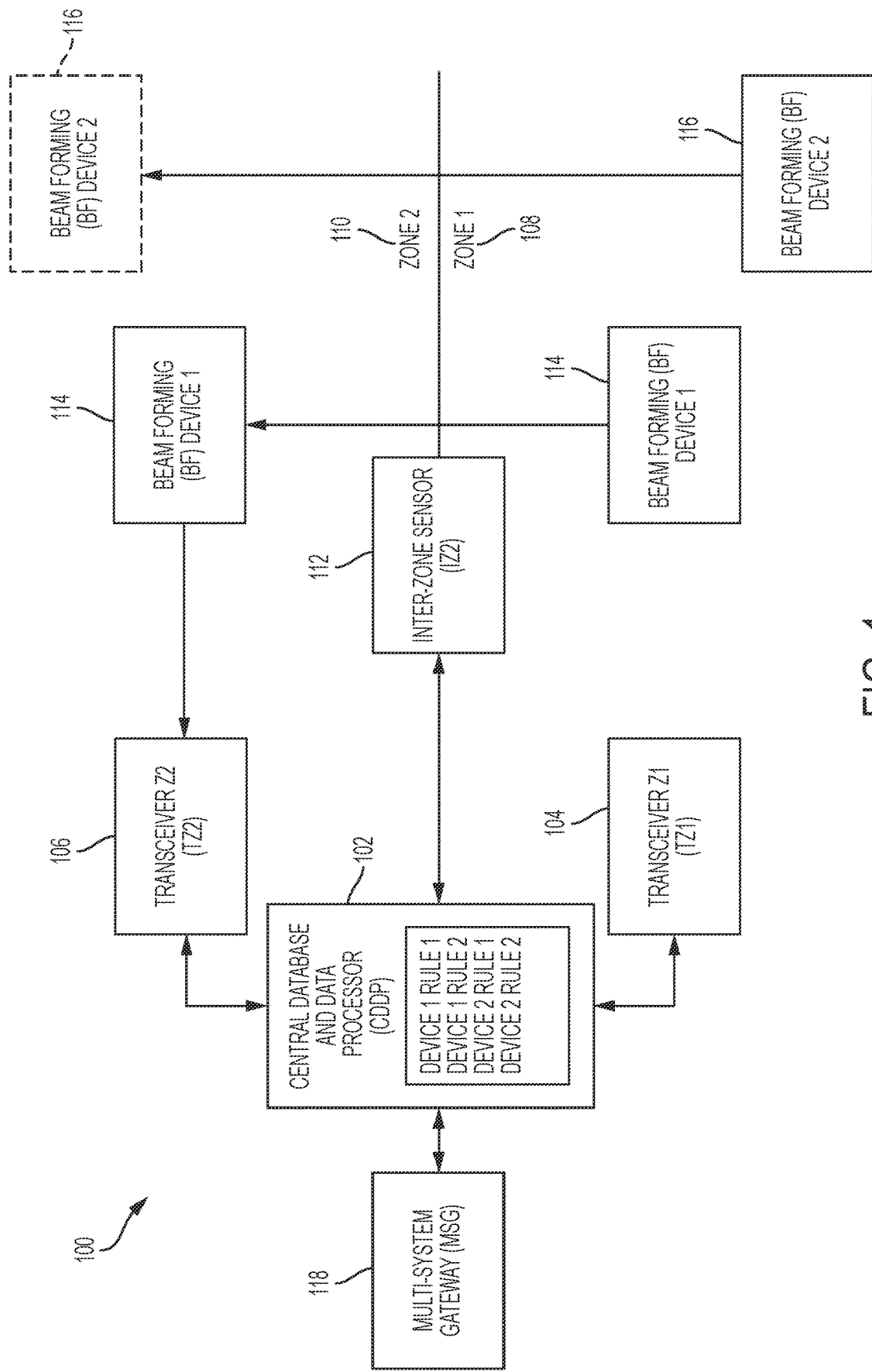
FIG. 1 shows a system 100, according to examples of the present disclosure.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention; it is to be understood that other embodiments may be utilized and that changes may be made without departing from the scope of the invention. The following description is, therefore, merely exemplary.

Generally speaking, examples of the present disclosure address problems associated with environments dealing with the ever-increasing data demands. Environments in the transportation industry tend to have unique considerations, including but not limited to airlines, trains, buses, cars, ships, etc. In the aviation example, airlines may request data about aircraft and passenger information. Aircraft and passenger information, which varies with time, can be captured and recorded securely and intelligently, decreasing the amount of stored data by conventional methods. Such information can include, but is not limited to, cabin surveillance and aircraft health monitoring. According to examples of the present disclosure, the system is also capable of transmitting and delivery of high definition media to passengers with the option of additional security layers.

Accordingly, an example of the present disclosure provides a system that is able to solve the connectivity challenges within vehicles. In a non-limiting example, the system is general enough to simultaneously solve a gamut of different needs by providing a multi-gigabit per second connectivity backbone for video surveillance systems (capable of uncompressed high definition video), sensor data gathering systems, and systems that aid in increasing autonomous vehicular operation. The present system is compatible with both existing and future aircraft models. Furthermore, the present system features a point-to-point and highly directional beam steering and beamforming technology that features highly directional communication between devices. This results in higher security since low range, highly directional beam characteristics means devices far away are unable to eavesdrop on data transmission.

High frequency data transmission (ex: 60 GHz) is desired for many airplane applications, such as video surveillance. Using a wired connection allows for high throughput information transmission but adds weight to the aircraft. A solution to this problem can be via wireless systems, but they typically rely on cryptographic techniques to secure communications. Other challenges include processors overwhelmed by substantial data processing as a result of high throughput connections. A general purpose, multi-gigabit per second wireless data transmission system is described. The system has the capability to accommodate a gamut of applications including video surveillance, vehicular health, and vehicular autonomous operation for mobile vehicles. Transfer of data between subsystems can be performed via a tri-band router that includes 2.4 GHz, 5 GHz, and 60 GHz. Depending on the application, a particular frequency band is used to wirelessly transfer the data to a server for analysis. In order to reduce the data storage requirement, the server runs a program that examines data variation over time.

FIG. 1 shows a system 100, in accordance with examples of the present disclosure. System 100 provides a secured localized wireless communication system for high frequency transmission by leveraging the propagation losses associated with high frequency transmission and highly formed beams. System 100 comprises a central control system, such as central database and data processor (CDDP) 102 in communication with inter-zone sensor (IZS) 112 for controlling access of devices in different communication zones, such as zone 1 108 and zone 2 110, and for devices moving within and across zones. Zone 1 108 and zone 2 110 can be logically or physical separated. CDDP 102 has data regarding permissible angles of arrival between a transceiver and device. The devices are beamforming and beam steering devices that provide a very narrow transmission beam from transceiver to device.

For example, a space can be divided into a number of different zones. The divisions can be physical divided by rooms or partitions or can be logically divided based on a layout of the space and assigned coordinates to the boundaries within the space. The boundary parameters can be stored in CDDP 102 or another physically connected or networked storage device or database. In one non-limiting example, an airline environment for example, zone 1 108 can be the cockpit of the plane and zone 2 110 can be the passenger compartment with the cockpit door defining the boundary between the two zones.

CDDP 102 can comprise a rules engine that is configured to determine access privileges for beamforming devices, such as device 114, for a particular zone, such as zone 1 108 and zone 2 110. Beamforming devices can be registered with CDDP 102 where identifying information of the beamforming device and/or the user of the beamforming device can be collected and recorded. The registration process can also access rights for the beamforming device for a particular zone. The registration information can be stored with a table or other suitable format in CDDP 102 or another connected storage device or database. By one non-limiting example, device 1 114 and device 2 116 can be registered with CDDP 102. During registration, device 1 114 can be registered by user 1 with permissions to communicate in both zone 1 108 and zone 2 110 and device 2 116 can be registered by user 2 with permissions to communicate in zone 1 108, but not in zone 2 110. These permissions can be stored as rules that can be executed by a rules engine of CDDP 102.

CDDP 102 can communicate with IZS 112, Transceiver Z1 (TZ1) 104, and Transceiver (TZ2) 106 to determine a location of each beamforming device, such as device 1 114 and device 2 116. IZS 112 can measure and/or detect one or more parameters to determine the location for each beamforming device. For example, the one or more parameters can include, but are not limited to, signal strength, angle of arrival (AoA), or other parameters or combination of parameters that can be derived from transmissions of the beamforming devices.

CDDP 102 and/or IZS 112 can communicate with one or more transceivers within each zone. Each of the one or more transceivers can be configured with an antenna that can be provide beamforming and/or beam steering capabilities. For example, the transceiver can be an access point, a base station, a repeater, or a similar networking component. As shown in FIG. 1, the system 100 comprises transceiver (TZ1) 104 in zone 1 108 and transceiver Z2 (TZ2) 106 in zone 2 110.

Once the beamforming devices are registered with CDDP 102, CDDP 102, in conjunction with IZS 112, can determine whether or not a particular beamforming device can communicate with a transceiver in a particular zone. By way of example, consider device 1 114 and device 2 116 are registered with CDDP 102 to user 1 and user 2 respectively. Device 1 114 is registered with a rule that device 1 114 can communicate with TZ1 104 in zone 1 108 and with TZ2 106 in zone 2 110, both based on an example AoA of ±45°. Device 2 116 is registered with a rule that device 2 116 can communicate with TZ1 104 in zone 1 108 with an example AoA of ±45°, for illustration, but is not authorized to communicate with TZ2 106 in zone 2 110.

As user 1 approaches the boundary between zone 1 108 and zone 2 110 with device 1 114, TZ1 104 can communicate location information to IZS 112 to begin monitoring the location of device 1 114. Alternatively, IZS 112, using its own antenna or antenna array and controller, can independently track the locations of beamforming devices, such as device 1 114 and device 2 116. Once device 1 114 reaches a critical location threshold parameter, such an example AoA of ±15° as determined by TZ1 104 and/or IZS 112, TZ1 and/or IZS 112 can communicate with CDDP 102 to determine if device 1 114 is permitted to access TZ2 106 in zone 2 110. CDDP 102 then engages the rules engine to determine access rights that are registered with device 1 114. The rules engine can perform a lookup in a database or retrieve previously stored information in a storage device to locate the specific rule for device 1 114 for operating in zone 2 110. In this instance since device 1 114 was registered with a rule that permits access to transceivers in zone 2 110, this information is provided to TZ1 104 and/or IZS 112 to begin monitoring for when device 1 114 crosses the boundary to zone 2 110. Additionally, TZ1 104 and/or IZS 112 can communicate with TZ2 106 informing TZ2 106 that device 1 114 is now in or about to cross into zone 2 110 and to begin looking for device 1 114. Once device 1 114 is in zone 2 110, device 1 114 communicates with TZ2 106.

Similarly, as user 2 approaches the boundary between zone 1 108 and zone 2 110 with device 2 116, TZ1 104 can communicate location information to IZS 112 to begin monitoring the location of device 2 116. Once device 2 116 reaches a critical location threshold parameter, such an example AoA of ±15° as determined by TZ1 104 and/or IZS 112, TZ1 and/or IZS 112 can communicate with CDDP 102 to determine if device 2 116 is permitted to access TZ2 106 in zone 2 110. CDDP 102 then engages the rules engine to determine access rights that are registered with device 2 116. The rules engine can perform a lookup in a database or retrieve previously stored information in a storage device to locate the specific rule for device 2 116 for operating in zone 2 110. In this instance since device 2 116 was registered with a rule that does not permit access to transceivers in zone 2 110, this information is provided to TZ1 104 and/or IZS 112 to begin monitoring for when device 1 114 crosses the boundary to zone 2 110. Additionally, TZ1 104 and/or IZS 112 can communicate with TZ2 106 informing TZ2 106 that device 1 114 is now in or about to cross into zone 2 110 and to begin looking for device 2 116. Since device 2 116 is not permitted to communicate with TZ2 106 in zone 2 110, TZ2 106 will not respond to transmissions by device 2 116.

In the instance that user 2 crosses back into zone 1 108 with device 2 116, TZ2 106 and/or IZS 112 can communicate location information to CDDP 102, where CDDP 102 can provide a command to TZ1 104 to permit access to device 2 116. Alternatively, TZ1 104 may store identifying information of permitted devices in memory and allow communication with device 2 116.

CDDP 102 can communicate with multi-system gateway (MSG) 118. MSG 118 can provide connectivity to other systems, including, but are not limited to, video surveillance systems, vehicular health systems, and vehicular autonomous operation systems for mobile vehicles.

The components of system 100 (CDDP 102, TZ1 104, TZ2 106, IZS 112, device 1 114, and device 2 116) use multi-band wireless technology that can each employ multiple (e.g., three) wireless radio components for wireless communications over multiple (e.g., three) wireless bands. The components of system 100 can dynamically and automatically select a channel at which the system components can wirelessly connect to other components of system 100. TZ1 104 and TZ2 106 functions as a wireless networking device or access point that facilitates communication between CDDP 102, IZS 112, device 1 114, device 2 116, and the Internet. In some examples, the components of system 100 implements and wirelessly communicates via the Institute of Electrical and Electronic Engineers (IEEE) 802.11 WLAN standard (e.g., Wi-Fi).

Figure 2:
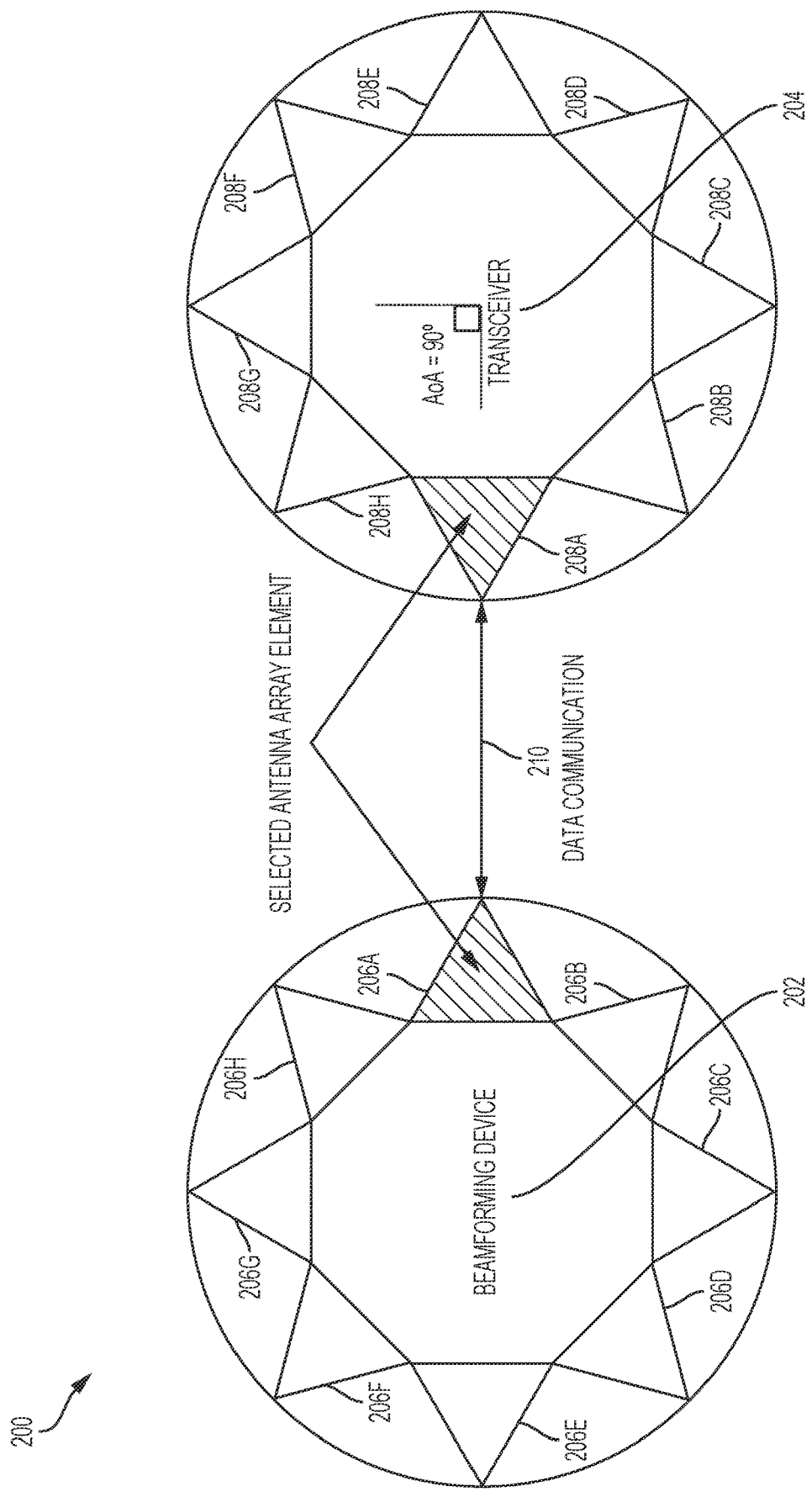
FIG. 2 shows the angle of arrival (AoA) between a beamforming device and a transceiver, according to examples of the present disclosure.

FIG. 2 shows the angle of arrival (AoA) determination 200 between a beamforming device and a transceiver, according to examples of the present disclosure. Beamforming device 202, such as device 1 114 or device 2 116, comprises an antenna array having antenna components 206A-206H. Similarly, transceiver 204, such as TZ1 104 or TZ2 106, comprises an antenna array having antenna components 208A-208H. As an example shown in FIG. 2, beamforming device 202 is performing data communication 210 with transceiver 201 between antenna component 206A and 208A with an AoA of 90°.

Figure 3:
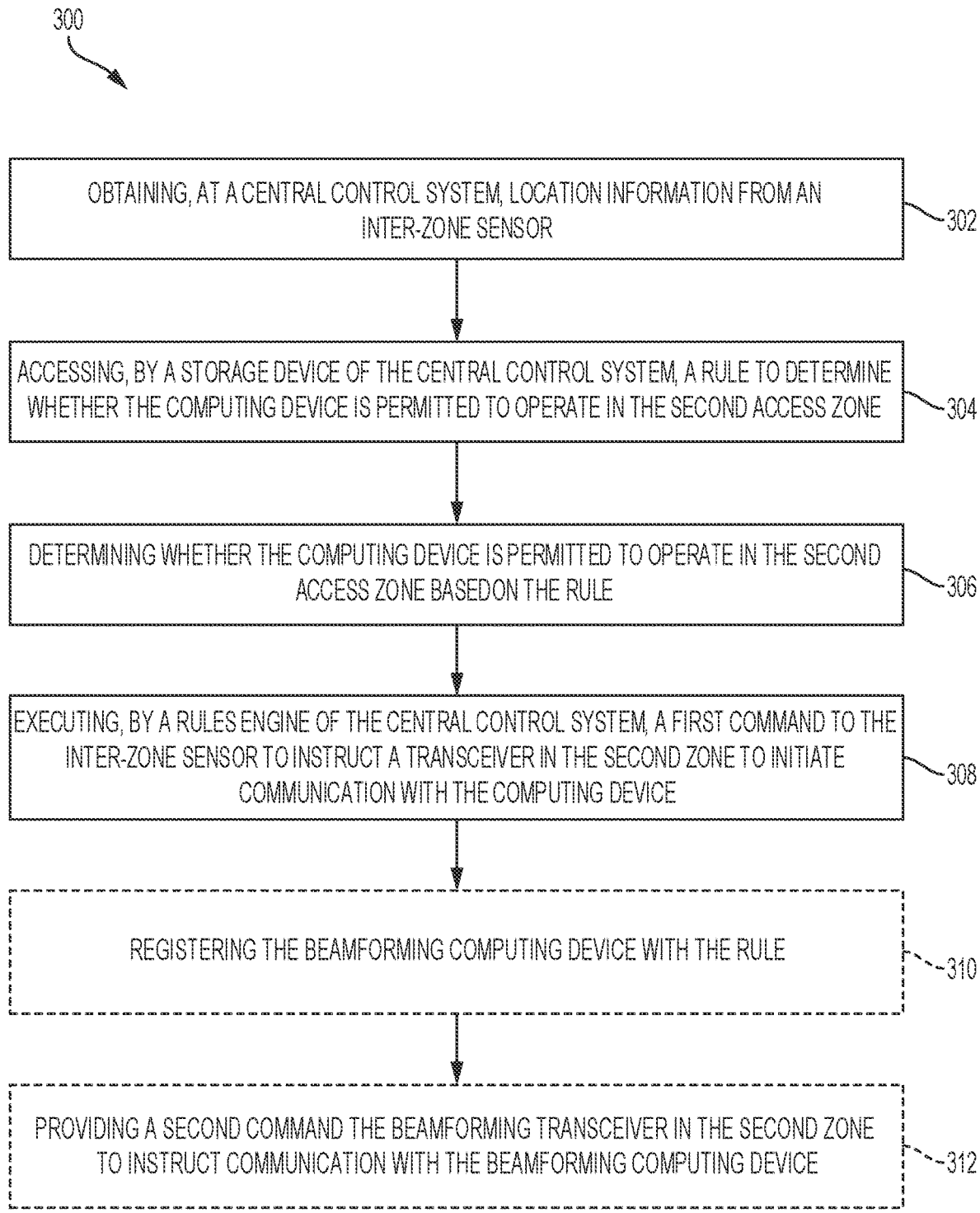
FIG. 3 shows a method 300 for determining access permission for a computing device with a transceiver communicating in a 60 GHz spectrum, in accordance with examples of the present disclosure.

FIG. 3 shows a method 300 for determining access permission for a computing device communicating with a transceiver in accordance with examples of the present disclosure. The communication can occur over the mmWave frequency band, such as at 60 GHz. The method 200 can begin by obtaining, at 302, at a central control system, location information from an inter-zone sensor. Turning back to the system 100 of FIG. 1, IZS 112 is configured to monitor and determine a location for a computing device, such as device 1 114 and/or device 2 116, as the computing device nears a boundary between a first access zone and a second access zone, such as a boundary between zone 1 108 and zone 2 110. The method 300 continues by accessing, at 304, by a storage device of the central control system, a rule to determine whether the computing device is permitted to operate in the second access zone. Continuing with the above example, CDDP 102 can access a rule for device 1 114 and/or device 2 116. The method 300 continues by determining, at 306, whether the computing device is permitted to operate in the second access zone based on the rule. Continuing with the above example, a rule for either device 1 114 and/or device 2 116 can be accessed by CDDP 102 that can define access rights for the device for a given zone. The method 300 continues by executing, at 308, by a rules engine of the central control system, a first command to the inter-zone sensor to instruct a transceiver in the second zone to initiate communication with the computing device. Continuing with the above example, once CDDP 102 accesses a rule for a particular device, CDDP 102 can provide a command to instruct IZS 112 and/or TZ2 106 to initiate communication with device 1 114 once device 1 114 enters zone 2 110. If device 1 114 and/or device 2 116 is not already registered with the CDDP 102, device 1 114 and/or device 2 116 can be registered with the rule at 310. In some examples, the method 300 can include, at 312, providing a second command to the beamforming transceiver, e.g., TZ2 106, in the second zone to instruct communication with the beamforming computing device, e.g. device 1 114 or device 2 116.

Figure 4:
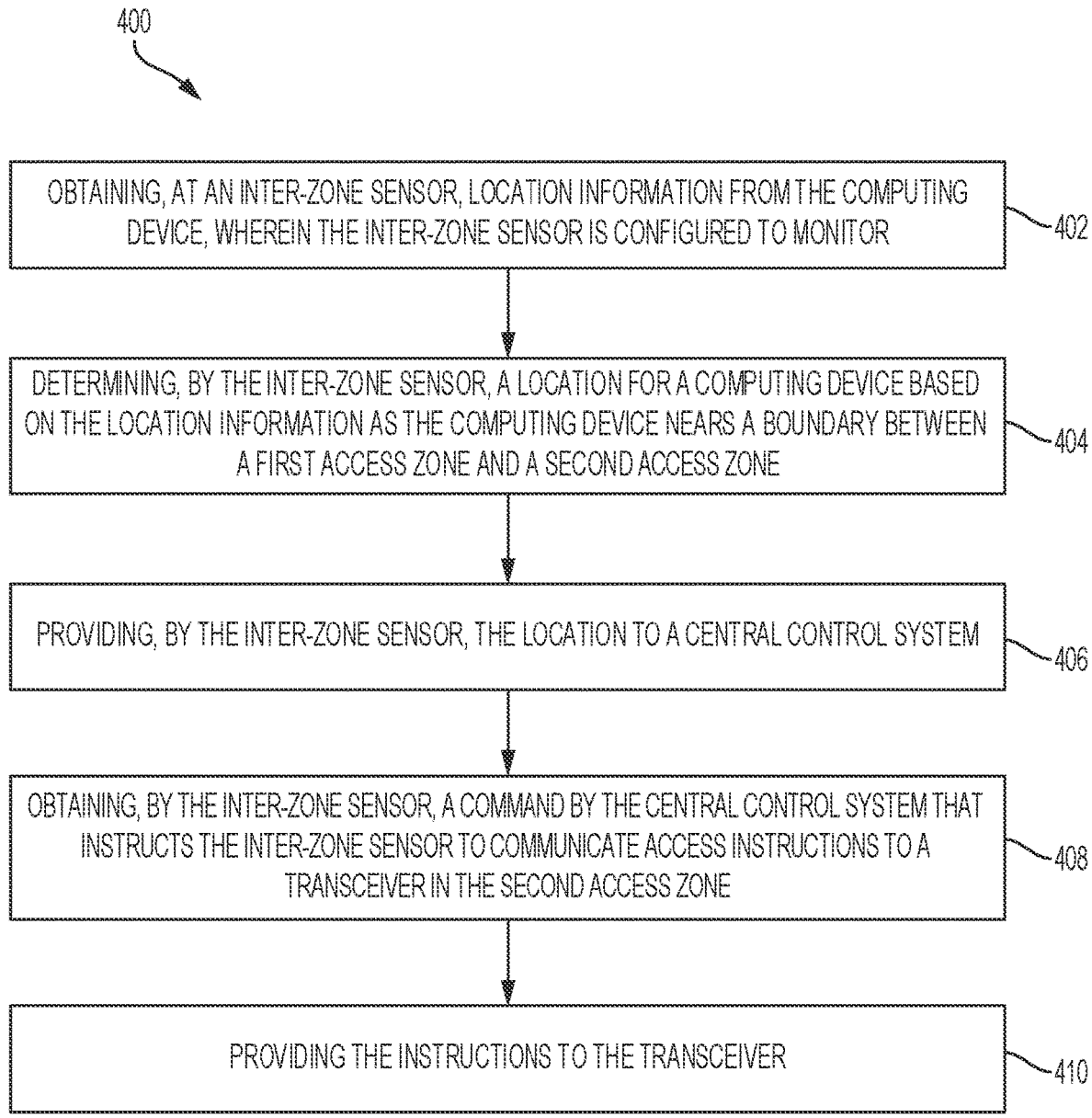
FIG. 4 shows a method 400 for determining access permission for a computing device with a transceiver communicating in a 60 GHz spectrum, according to examples of the present disclosure.

FIG. 4 shows a method for determining access permission for a computing device communicating with a transceiver, according to examples of the present disclosure. The communication can occur over the mmWave frequency band, such as at 60 GHz. The method 400 can begin by obtaining, at 402, at an inter-zone sensor, location information from the computing device. The inter-zone sensor is configured to monitor and determine a location for a computing device as the computing device nears a boundary between a first access zone and a second access zone. Turning again to FIG. 1, IZS 112 can obtain and/or determine location information of device 1 114 and/or device 116.

The method 400 continues by determining, at 404, by the inter-zone sensor, a location for a computing device based on the location information as the computing device nears a boundary between a first access zone and a second access zone. Continuing with the example, IZS 112 can obtain and/or determine the location information using a signal strength measurement and/or AoA from device 1 114 and/or device 2 116. In one non-limiting example, the critical threshold for the AoA can be ±15°.

The method 400 continues by providing, at 406, by the inter-zone sensor, the location to a central control system. Continuing with the example, once IZS 112 determines that the signal strength measurement and/or AoA for device 1 114 and/or device 2 116 reaches a critical threshold, IZS 112 can communicate with CDDP 102 to inform CDDP 102 that device 1 114 and/or device 2 116 is near the boundary between zone 1 108 and zone 2 110.

The method 400 continues by obtaining, at 408, by the inter-zone sensor, a command by the central control system that instructs the inter-zone sensor to communicate access instructions to a transceiver in the second access zone. Continuing with the above example, CDDP 102 can access a rule for device 1 114 and/or device 2 116, where the rule defines access rights for the device for a given zone. Once CDDP 102 applies the rules engine to determine which rule applies, CDDP 102 communicates instructions to IZS 112. In this example, a rule indicates that device 1 114 may communicate in zone 2 110, but not device 2 116. The instructions obtained from IZS 112 from CDDP 102 can then instruct TZ2 106 to begin looking for device 1 114, but not to permit communication with device 2 116.

The method 400 continues by providing, at 410, the instructions to the transceiver. Continuing with the above example, IZS 112 instructs TZ2 106 to begin looking for device 1 114, but not to permit communication with device 2 116.

Figure 5:
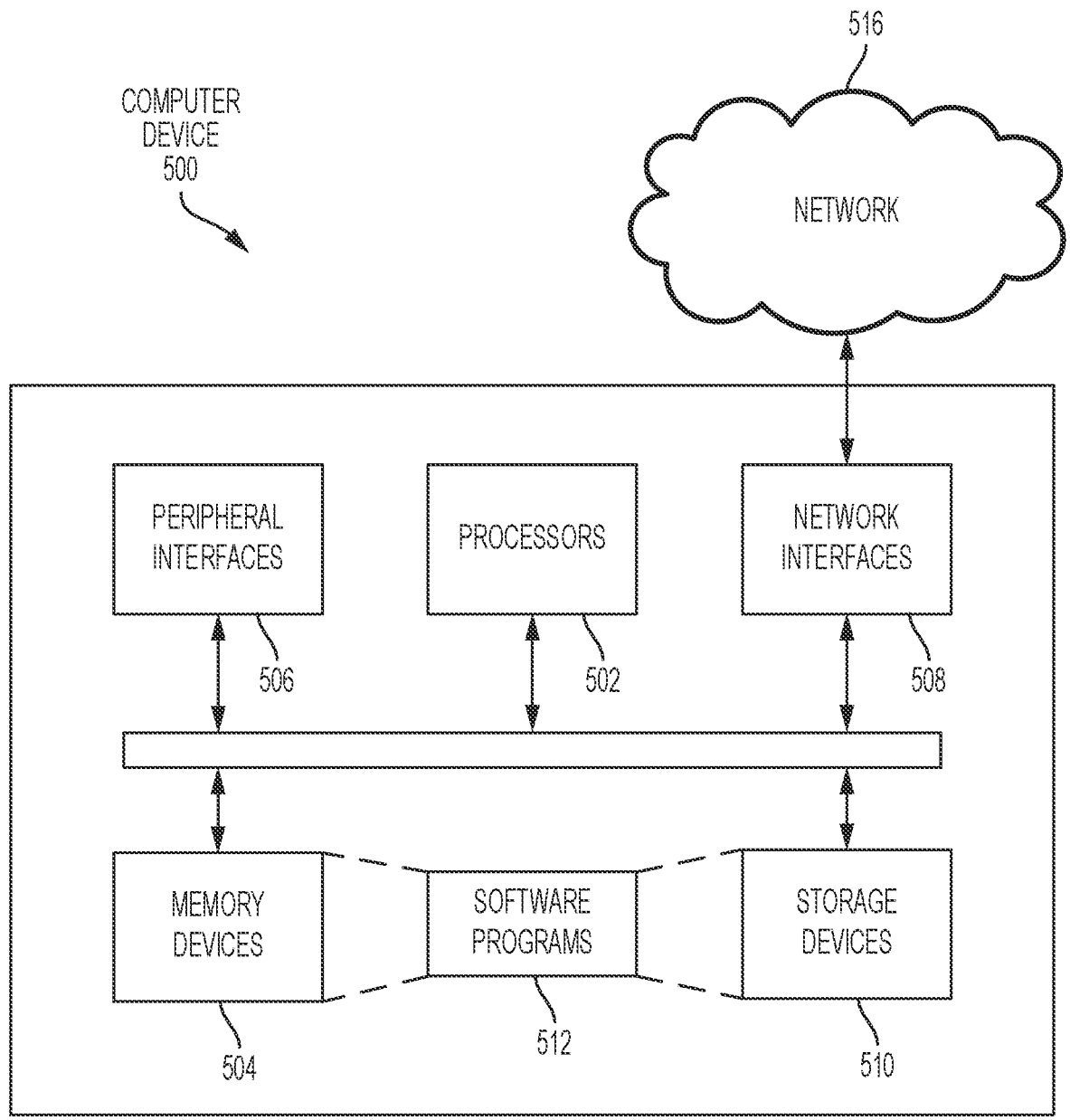
FIG. 5 illustrates an example of a hardware configuration for a computer device 500 that can be used as a component of system 100, which can be used to perform one or more of the processes described above.

FIG. 5 illustrates an example of a hardware configuration for a computer device 500 that can be used as a component of system 100, which can be used to perform one or more of the processes described above. The computer device 500 can be any type of computer devices, such as desktops, laptops, servers, etc., or mobile devices, such as smart telephones, tablet computers, cellular telephones, personal digital assistants, etc. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the above-described operations can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality described above. The one or more software programs 512 can include instructions that cause the one or more processors 502 to perform the processes described herein. Copies of the one or more software programs 512 can be stored in the one or more memory devices 504 and/or on the one or more storage devices 510. Likewise, the data utilized by one or more software programs 512 can be stored in the one or more memory devices 504 and/or on the one or more storage devices 510.

In implementations, the computer device 500 can communicate with other devices via a network 516. The other devices can be any types of devices as described above. The network 516 can be any type of network, such as a local area network, a wide-area network, a virtual private network, the Internet, an intranet, an extranet, a public switched telephone network, an infrared network, a wireless network, and any combination thereof. The network 516 can support communications using any of a variety of commercially-available protocols, such as TCP/IP, UDP, OSI, FTP, UPnP, NFS, CIFS, AppleTalk, and the like. The network 516 can be, for example, a local area network, a wide-area network, a virtual private network, the Internet, an intranet, an extranet, a public switched telephone network, an infrared network, a wireless network, and any combination thereof.

The network can include one or more antennas or antenna array, which may include any type of antennas suitable for transmitting and/or receiving wireless communication signals, blocks, frames, transmission streams, packets, messages and/or data. For example, the one or more antennas or antenna array may include any suitable configuration, structure and/or arrangement of one or more antenna elements, components, units, assemblies and/or arrays. The one or more antennas or antenna array may include, for example, antennas suitable for directional communication, e.g., using beamforming techniques. For example, the one or more antennas or antenna array may include a phased array antenna, a multiple element antenna, a set of switched beam antennas, and/or the like. In some embodiments, the one or more antennas or antenna array may implement transmit and receive functionalities using separate transmit and receive antenna elements. In some embodiments, the one or more antennas or antenna array may implement transmit and receive functionalities using common and/or integrated transmit/receive elements. In some examples, the one or more antennas or antenna array may communicate over a wireless communication medium and may include a wireless communication channel over a 2.4 Gigahertz (GHz) frequency band, or a 5 GHz frequency band, a mmWave frequency band, e.g., a 60 GHz frequency band, a S1G band, and/or any other frequency band.

The computer device 500 may include one or more radios including circuitry and/or logic to perform wireless communication between wireless communication devices. The one or more radios may include one or more wireless receivers (Rx) including circuitry and/or logic to receive wireless communication signals, RF signals, frames, blocks, transmission streams, packets, messages, data items, and/or data. The one or more radios may include one or more wireless transmitters (Tx) including circuitry and/or logic to transmit wireless communication signals, RF signals, frames, blocks, transmission streams, packets, messages, data items, and/or data.

In some examples, the one or more radios, transmitter(s), and/or receiver(s) may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, the one or more radios may include or may be implemented as part of a wireless Network Interface Card (NIC), and the like. In some examples, the one or more radios may be configured to communicate over a 2.4 GHz band, a 5 GHz band, a S1G band, a directional band, e.g., an mmWave band, and/or any other band. In some examples, the one or more radios may include, or may be associated with, the one or more antennas, respectively.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not of limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur by persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like, can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method for determining access permission for a beamforming computing device communicating with a beamforming transceiver, the method comprising:
    obtaining, over a vehicular wireless communication network at a vehicular inter-zone sensor that monitors and provides wireless access of beamforming computing devices in different wireless communication access zones of a vehicle, location information from the beamforming computing device;
    determining, by the vehicular inter-zone sensor, the location for the beamforming computing device based on the location information as the beamforming computing device nears a vehicular boundary between a first wireless communication access zone and a wireless communication second access zone of a vehicle;
    providing, by the vehicular inter-zone sensor, the location to a central control system;
    obtaining, by the vehicular inter-zone sensor, a command by the central control system that instructs the vehicular inter-zone sensor to communicate access instructions to a beamforming transceiver in the second wireless communication access zone; and
    providing the access instructions to the beamforming transceiver,
    wherein the access instructions are related to a rule that determines whether the beamforming computing device is permitted to operate in the second wireless communication access zone based on user permissions established during registration to communicate in a particular access communication zone within the vehicle.

2. The method of claim 1, wherein the location information is derived from a signal strength measurement, an angle of arrival, or both.

3. The method of claim 1, wherein the access instructions permit the beamforming computing device to communicate with the beamforming transceiver.

4. The method of claim 1, wherein the access instructions do not permit the beamforming computing device to communicate with the beamforming transceiver.

5. The method of claim 1, wherein the beamforming computing device and the beamforming transceiver communicate over a millimeter wave band.

6. The method of claim 1, wherein the command is based on user permissions established during registration to communicate in a particular access zone.

7. The method of claim 1, wherein the vehicle is an airplane.

8. The method of claim 1, wherein the beamforming computing device and the beamforming transceiver communicate using a tri-band router that comprises 2.4 GHz, 5 GHz, and 60 GHz communication transmission bands.

9. The method of claim 1, wherein the beamforming transceiver comprises an antenna that is configured to perform beam steering.

10. The method of claim 1, wherein the user permissions are stored in a central control system of the vehicle.

11. A transportation vehicle comprising:
    a transportation vehicular inter-zone sensor configured to define the transportation vehicle into a first wireless communication access zone and a second wireless communication access zone of the transportation vehicle, monitor, and provides wireless access of beamforming computing devices in different wireless communication access zones of the transportation vehicle;
    a transportation vehicle wireless communication network;
    a computer system that is in communication with the transportation vehicular inter-zone sensor and the transportation vehicle wireless communication network, the computer system comprising:
        a hardware processor;
        a non-transitory computer readable medium configured to store operations that when executed by the hardware processor perform operations for determining access permission for a beamforming computing device communicating with a beamforming transceiver, the operations comprising:
            obtaining, over the transportation vehicle wireless communication network, location information from the beamforming computing device;
            determining the location for the beamforming computing device based on the location information as the beamforming computing device nears a transportation vehicle boundary between the first wireless communication access zone and the second wireless communication access zone;
            providing the location to a central control system;
            obtaining a command by the central control system that instructs the transportation vehicular inter-zone sensor to communicate access instructions to a beamforming transceiver in the second wireless communication access zone; and
            providing the access instructions to the beamforming transceiver,
            wherein the access instructions are related to a rule that determines whether the beamforming computing device is permitted to operate in the second wireless communication access zone based on user permissions established during registration to communicate in a particular access communication zone within the transportation vehicle.

12. The transportation vehicle of claim 11, wherein the location information is derived from a signal strength measurement, an angle of arrival, or both.

13. The transportation vehicle of claim 11, wherein the access instructions permit the beamforming computing device to communicate with the beamforming transceiver.

14. The transportation vehicle of claim 11, wherein the access instructions do not permit the beamforming computing device to communicate with the beamforming transceiver.

15. The transportation vehicle of claim 11, wherein the beamforming computing device and the beamforming transceiver communicate over a millimeter wave band.

16. The transportation vehicle of claim 11, wherein the command is based on user permissions established during registration to communicate in a particular access zone.

17. The transportation vehicle of claim 11, wherein the transportation vehicle is an airplane.

18. The transportation vehicle of claim 11, wherein the beamforming computing device and the beamforming transceiver communicate using a tri-band router that comprises 2.4 GHz, 5 GHz, and 60 GHz communication transmission bands.

19. The transportation vehicle of claim 11, wherein the beamforming transceiver comprises an antenna that is configured to perform beam steering.

20. The transportation vehicle of claim 11, wherein the user permissions are stored in a central control system of the transportation vehicle.

\* \* \* \* \*